United States Patent

[11] 3,584,941

| [72] | Inventor | Rogers B. Downey<br>Lexington, Mass. |
|---|---|---|
| [21] | Appl. No. | 794,728 |
| [22] | Filed | Jan. 28, 1969 |
| [45] | Patented | June 15, 1971 |
| [73] | Assignee | Polaroid Corporation<br>Cambridge, Mass. |

[54] FILM CASSETTE AND PROJECTOR HAVING INTERDEPENDENT OPTICAL COMPONENTS
12 Claims, 5 Drawing Figs.

[52] U.S. Cl. .................................................. 352/78, 352/130
[51] Int. Cl. ............................................... G03b 23/02
[50] Field of Search .......................................... 352/72, 78, 130, 198; 95/90.5; 242/197, 199, 200; 350/292

[56] References Cited
UNITED STATES PATENTS

| 2,279,022 | 4/1942 | Duskes | 352/72 UX |
| 2,455,187 | 11/1948 | Owens | 352/78 X |
| 3,281,199 | 10/1966 | Kingston | 352/78 X |
| 3,383,998 | 5/1968 | Takats | 95/90.5 |
| 3,410,498 | 11/1968 | Winkler et al. | 352/78 X |

*Primary Examiner*—Louis R. Prince
*Assistant Examiner*—Joseph W. Roskos
*Attorneys*—Brown and Mikulka, William D. Roberson and Robert L. Berger ABSTRACT: Photographic apparatus in the form of a compact motion-picture projector and film cassette in which overall illumination of the film for projection purposes is cooperatively assumed by components of both the projector and cassette to enable maximum use of a relatively large effective aperture of the projection optics.

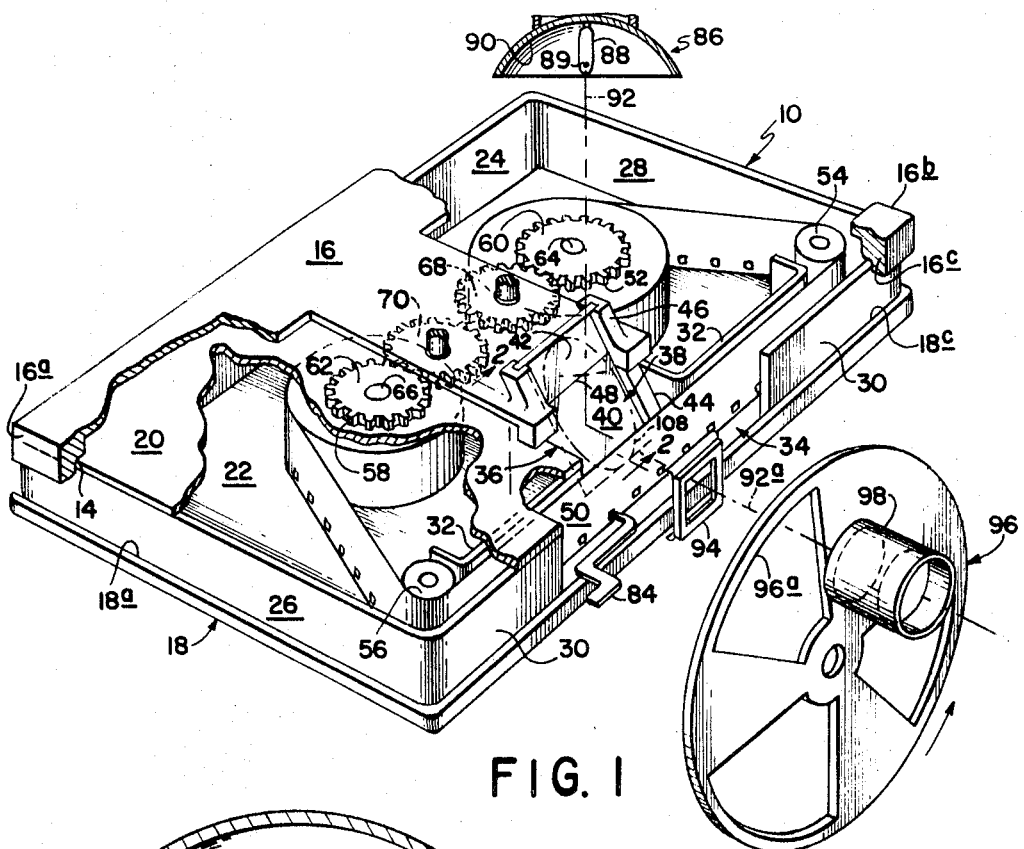
FIG. 1
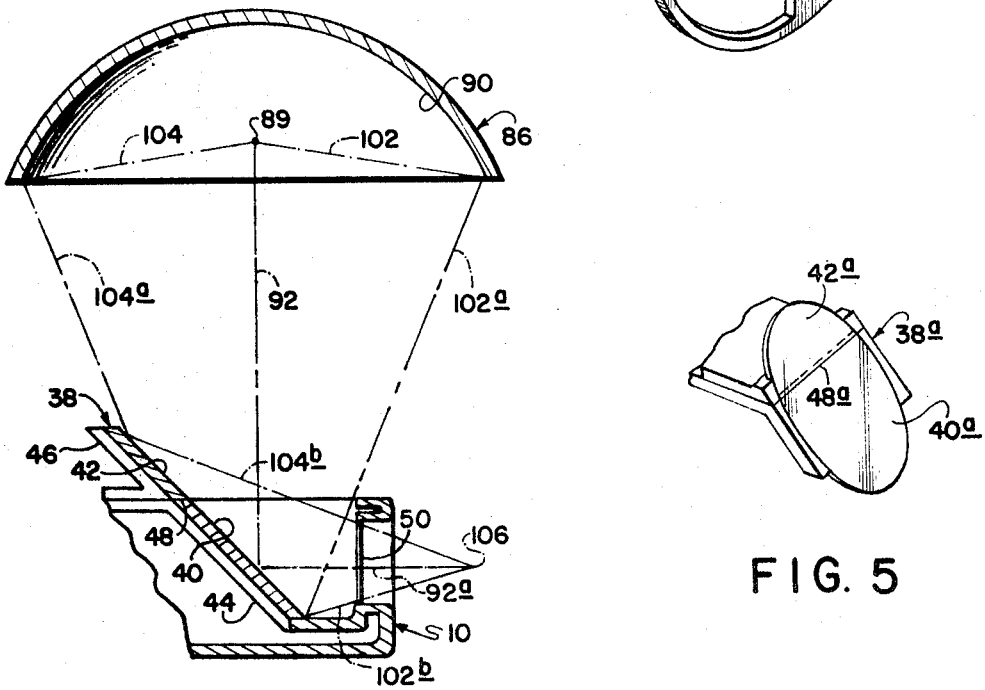
FIG. 2
FIG. 5
INVENTOR.
ROGERS B. DOWNEY
BY Brown and Mikulka
ATTORNEYS

PATENTED JUN 15 1971 3,584,941

INVENTOR.
ROGERS B. DOWNEY

BY Brown and Mikulka

ATTORNEYS 3,584,941

1

FILM CASSETTE AND PROJECTOR HAVING INTERDEPENDENT OPTICAL COMPONENTS

BACKGROUND OF THE INVENTION

The present invention relates to a system of motion picture projection which, thus far, has been little developed, namely one in which a generally self-sufficient film-carrying cassette unit is employed incorporating film supply and takeup means cooperating with simple projector driving mechanism and perhaps, also, including a rewind capability.

Cassettes of the foregoing category offer the advantages of extreme convenience and rapidity of operation in the projection of motion-picture film inasmuch as, to all intents and purposes, they can merely be inserted in a projector, their footage run off, and then be removed in favor of subsequent cassettes. An infinite number of film sequences may be shown in this manner without the necessity of employing such means as separate external takeup components or a multiplicity of projector elements. Also eliminated are arduous and time-consuming film guiding and threading operations and the like, it being required only to insert and remove each cassette as a unit to project a film print.

As illustrated herein, it is to be assumed that the film has been processed prior to its being loaded in the cassette and, accordingly, that it is adapted to projection. It is further to be understood, however, that the cassette may incorporate or operate in cooperation with introduced rapid film-processing means involving, for example, a diffusion transfer process. Motion-picture film of a type contemplated in conjunction with such a process has a higher density than that of conventional motion-picture film. Accordingly, a high-intensity light source and maximum use of its rays is of special importance. In the instance where film processing is involved, the cassette may initially hold unexposed film and be adapted to mounting in a camera for exposure of the film. The film may undergo processing within the cassette during a rewind operation when in the camera; when in an intermediate instrumentality; or when mounted in the projector as previously suggested.

Assuming the cassette to be employed in a projection capacity, which is at least one ultimate function pertaining to any of the foregoing methods of usage, it has been the general practice to introduce either an actual or an effective light source into a cavity of the cassette located behind an aperture thereof across which the frames of film are caused to be intermittently advanced by a cooperating conventional projector mechanism. More particularly, the method has been that of positioning a reflecting member at this location to receive the significant rays of light from a remotely mounted source of illumination and directing the rays to the film and thence to the objective lens system of the projector in conjunction with suitable gating and shutter components. Projection systems relating in one or more respects to those above outlined, that is, involving cassette supply and takeup means with permanent attachment of film leading and trailing extremities thereto, and including film rewind means are described, for example, in the copending Pat. applications Ser. Nos. 761,756 filed Sept. 23, 1968 in the name of Gerald H. Cook; Ser. No. 761,771 filed Sept. 23, 1968 in the name of Rogers B. Downey; Ser. No. 755,901 filed Aug. 28, 1968 in the name of Edwin H. Land; Ser. No. 783,242 filed in the name of Rogers B. Downey; and Ser. No. 767,609 filed Oct. 15, 1968 in the name of Herbert A. Bing, all of which are assigned to the assignee of the present invention.

The present invention distinguishes over the prior art principally with respect to the dual-component high-efficiency reflective means which enables a maximum use of projection optics of large aperture while maintaining the essential thinness of the cassette. The relative light-directing means disclosed herein is less complicated and less expensive than that of any comparable device described in the literature. Other features of the subject apparatus relate to specific structure which permits a simple slidable insertion of the cassette in the projector thus providing a correct relation of optical and driving components.

SUMMARY OF THE INVENTION

The subject invention is directed to interdependent motion-picture projection apparatus comprising a compact film cassette component and a special projector component which are intended for operation together The apparatus is especially adapted to be employed with motion-picture film material of relatively high density and with a projector objective of large aperture to make possible a maximum utilization of light rays for illumination purposes.

A principal feature of the invention is that which provides control of these light rays through relatively simple and inexpensive structure without sacrificing the compact characteristics of cassette and projector and especially without altering the desirably narrow dimensions of the cassette. This is achieved by incorporating a first reflective light-directing means within the cassette and a second and complementary reflective light-directing means within the projector. When the cassette is mounted in the projector, related structure of the cassette and projector insure that the two complementary reflective means are automatically brought to correct alignment in a given plane to provide the reflection of a large cone of light to a lens of large aperture. When thus positioned, they constitute, in effect, a unitary light-gathering and directing device of maximum efficiency.

In accordance with the foregoing considerations, objects of the invention are to provide a two-element reflective illumination device for use with a remote light source in projecting a motion-picture film carried in a compact cassette, the device being of high efficiency, relatively low in cost, and conducive to an extreme thinness of the cassette; to provide a motion-picture projector and a compact film cassette for use therewith each of which comprises complementary illumination components of the projection system; to provide a film cassette of the character described which is interdependent upon means of the projector for projection purposes but which is adapted, also, to use in a camera for exposure of the film prior to its processing and projection, to provide a dual-comporient reflective light-directing device, as characterized, incorporated partially in a projector and partially in a film cassette and brought into optical alignment when the two are in assembled relation for projection purposes; to provide a reflective light-directing device as stated wherein each component is in the form of a plane mirror; and to provide a projector and film cassette as set forth embodying complementary film advancing and rewind mechanism, the cassette being adapted to slidable insertion into the projector to establish alignment of optical and film driving means.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a diagrammatic perspective view of cassette and complementary projector components of the invention;

FIG. 2 is an enlarged diagrammatic view, partly in section, of the reflective light-directing components taken along the line 2—2 of FIG. 1.

Figure 4:
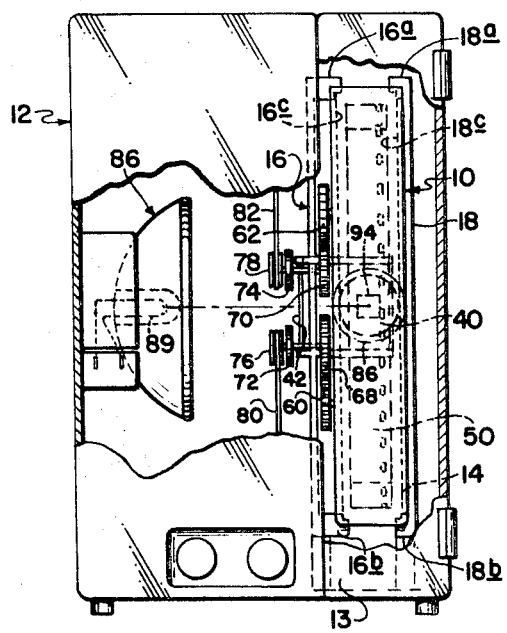

FIG. 4 is a diagrammatic rear view of the projector with parts broken away to amplify illustration of the slidable mounting means shown in FIG. 1 which provide a correct alignment of optical and driving elements of the cassette and projector; and FIG. 5 is a diagrammatic fragmentary view of a modification of the dual-component reflective light-directing device illustrating an additionally condensed form thereof.

Figure 3:
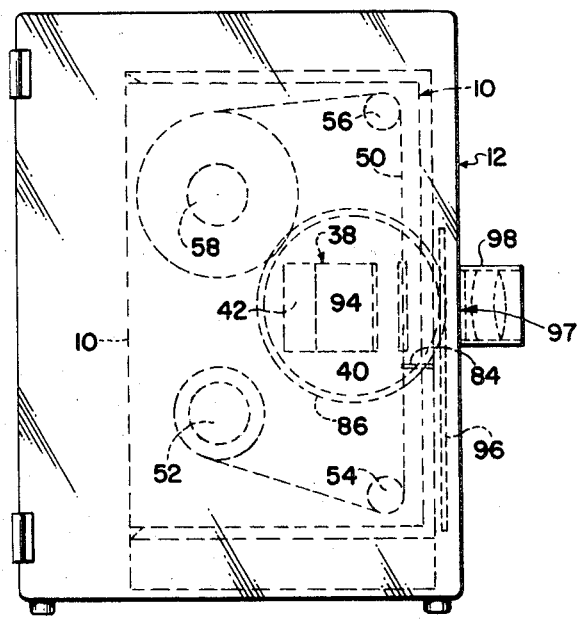
FIG. 3 is a diagrammatic side view of the projector further illustrating the functional relationship of projector and cassette components.

Referring now to the drawings, the generally rectangular cassette 10 is illustrated in relation to complementary components of a projector 12. The cassette is mounted vertically within the projector, as indicated in FIGS. 3 and 4, through an aperture provided by swinging the hinged door 13 to an open position, the horizontal disposition of FIG. 1 being for the purpose of showing parts not otherwise readily visible. The cassette is slidably mounted in channel means 14 formed in upper and lower extremities 16a, 16b and 18a, 18b, of a pair of semienclosing webs 16 and 18 of the projector to a depth established by the interconnecting end portions 16c and 18c of the webs. The portions 16c and 18c serve as limit stops and, as will be more fully evident below, automatically establish a correct position and relationship of complementary components of the projector a nd cassette when the latter is mounted in the former.

The cassette housing includes sidewalls 20 and 22, a rear wall 24, end walls 26 and 28, and a two-part or split front wall 30. The side and end walls bear slidably against the channels 14. A two-part light baffle 32 is mounted slightly inwardly of front wall 30. The space intervening between and extending inwardly of the two parts of front wall 30 and those of baffle 32 constitute a functional light-transmitting aperture 34 to be described below. An aperture 36 formed in the sidewall 20 and extending inwardly thereof also serves a light-passing function to be further explained. As illustrated, the apertures 34 and 36 merge into one another to provide one generally continuous cavity or chamber but a line of demarcation between the two apertures could be provided by slender corner pieces extending between the spaced parts of wall 30. As shown, interconnecting member 16c may be considered as separating the two apertures. The member 16c may, however, be altered to assume the form of two short pieces at the corners and still serve its limit stop function, without extending across the aperture 34.

A reflective element 38 composed of two flat mirrorlike sections 40 and 42 is mounted at a given angle within the cavity formed by apertures 34 and 36. The section 40 is mounted in an angularly slotted bracket 44 integral with the baffle 32 of the cassette. The section 42 is mounted in a similarly angularly slotted bracket 46 integral with the web 16 of the projector. The two adjacent edges of the reflective sections 40 and 42 are angled to provide a thin line of abutment at 48 so that, in effect, a continuously reflecting surface is thus formed. Whether the surface is of a front- or rear-reflecting type is not critical to the system.

A length of motion-picture film 50 of given characteristics, as, for example, one having an image area and sprocket-hole arrangement similar to that designated "super-8" film, is provided on a supply spool 52 to which its trailing end is attached. The film passes around a quide roller 54, across the aperture 34, and around a snubbing element 56 to the takeup spool 58, its leading extremity being attached to the latter. Each spool 52 and 58 has an individual driving spur-gear 60 and 62, respectively, fastened to the shafts 64 and 66 which are integral with the spools. Driving spur-gears 68 and 70 of the projector are mounted for rotation in bearings of the web 16 and are driven, through intermediate means exemplified by friction clutches 72 and 74, pulleys 76 and 78, and belts 80 and 82, by a suitable electric motor or motors of the projector, not shown. The takeup spool is rotated by the gears 70 and 62 is a clockwise direction, as shown in FIG. 1, to wind the film on takeup spool 58 as, for instance, during projection. During this operation, the supply spool 52 is permitted to rotate without restraint except perhaps for a slight application of damping force to its shaft 64. After a complete film sequence has been wound on spool 58, the trailing end of the film still being attached to spool 52, the latter spool is rotated by gears 68 and 52 in a counterclockwise direction as shown in FIG. 1, in a rewind procedure, the takeup spool rotating substantially freely in a similar direction.

During the foregoing operations, the friction clutches 72 and 74 permit a controlled slippage of the driving mechanism for each spool when the full complement of film has been wound thereon, the film extremities being permanently attached to the spools as previously stated. The film advance to takeup spool 58 is accomplished intermittently through action of the projector intermittent movement, represented by the claw element 84, in conjunction with the snubber 56, fixed against rotation, and the takeup spool in a manner known to the art. The rewind operation involves a continuous return movement of the film to the supply spool 52, the snubber then acting as a freely rotating guide roller.

The operation of the split-component reflective element 38 in conjunction with a light source 86 predeterminedly positioned in the projector 12 will now be considered. The light source 86 includes a lamp 88 having a filament 89 and a concave reflector 90 functioning as a condenser. A suitable light source of the aforesaid type in which the reflector is a unitary component is a tungsten halogen projector lamp, type "DNF" 150 watts, 21 volts, sold by the Sylvania Electric Products Division of General Telephone Co., Salem, Mass., U.S.A.

The composite mirror 38 is positioned at an angle of approximately 45° with respect to the central ray 92 emanating from the filament 89 and to the plane of the film 50. This central ray is thus redirected as ray 92a at an angle of 90° to its initial direction so as to be transmitted, respectively, through film 50, through elements of the projector represented diagrammatically including gating means 94, apertures 96a of the rotary shutter 96, a housing aperture at 97, and the objective 98, and thence to a screen, not shown.

As more particularly illustrated in FIG. 2, the diverging rays 102 and 104 emitted by the filament 89 are collected by the reflector 90 and are reflected as rays 102a and 104a in steeply converging directions to provide a cone of light incident upon the abutting reflecting sections or components 40 and 42 of reflective element 38 and thence, as rays 102b and 104b, to a focal point 106 at which the filament image is focused. As will be apparent, the surface of section 40, limited in extent by the thin transverse dimension of the cassette which may, desirably, be no more than 0.6 inch, receives and is capable of reflecting only a portion, e.g., about two-thirds of the useful rays. Accordingly, if only the reflective section 40 were devoted to the purpose, the light available for illumination of the film would be greatly curtailed and, in terms of a film material of a density requiring a high illumination, would be inadequate for the projection of satisfactory images. The provision of the reflective section 42 at a functional position when the cassette is slidably inserted in the projector insures the utilization of all of the available light rays for projection purposes.

Further referring to FIG. 2, it may be assumed that the dimensions of cooperating cassette and projector elements shown are roughly twice those of the contemplated system and that the given configuration and relative position of elements are merely illustrative. Accordingly, the following data relating thereto and to the film and objective are approximate and are to be considered only by way of example.

Diameter of reflector 90 at open face.—1⅞"
Filament 89 to reflector 90 along central ray axis.—⅝"
Filament 89 to reflective component 40 along axis.—1⁷⁄₁₆"
Reflective component 40 to focal point 106.—⅝"
Angle of element 38 to film.—45°
Reflective section 40.—⁹⁄₁₆" x ⁹⁄₁₆"
Reflective section 42.—⁵⁄₁₆" x ⁹⁄₁₆"
Film.—⁵⁄₁₆" width (8 mm. or "Super-8")
Image area of film.—.158" x .211"
Aperture of objective 98.—28 mm.
Focal length of objective 98.—28 mm.
Reflective component 40 to film (central ray) = .35"
Relative aperture of objective 98.—f/1.0
Cassette thickness.—.5" to .6"

The cone of convergent light rays incident upon the composite reflective element 38 is of an elliptical form, as indicated by the broken line 108 of FIG. 1. The two reflective sections may thus be modified in shape to conform more closely to that of the cone itself where, for instance, a diminution of area of the reflective element is of advantage. Such a modification is illustrated in the structure of the reflective element 38a of FIG. 5.

Since certain changes may be made in the above apparatus without departing from the scope of the invention herein involved, it is intended that all matter contained in the above description or shown in the accompanying drawings shall be interpreted as illustrative and not in a limiting sense.

What I claim is:

1. A motion-picture projector for use with a supplemental light-reflective element of a film-cassette mounted in said projector to provide a maximum illumination of the film carried by said cassette for projection purposes said projector comprising:
   A housing having a light-emitting aperture formed therein;
   a film-moving mechanism adapted to cooperate with film supply and takeup means of said cassette;
   gating means, a shutter, and an objective mounted adjacent to said aperture;
   means providing access to the interior of said housing for loading and removing said cassette;
   mounting and limit-stop means for releasably positioning said cassette at a correct functional location within said housing;
   a light source and condenser means so mounted as to direct convergent rays toward an aperture of said cassette and said light-reflective element angularly positioned therewithin; and
   light-reflective means so angularly mounted on an internal support of the projector as to abut an extremity of said light-reflective element which extends through an aperture of the cassette and, in effect, to provide an extension of the reflecting surface thereof, said light-reflective means being limited in one direction as to the extent of its functional reflective area by an abutting edge of said light-reflective element of the cassette and, accordingly, being capable of intercepting merely a portion of the light rays from said light source and directing said portion toward the film but, in conjunction with said light-reflective element of the cassette, constituting a composite reflective element adapted to intercept and direct substantially all of the light rays emanating from said light source.

2. A motion-picture projector, as defined in claim 1, wherein said access, mounting and limit-stop means include, respectively, an openable wall portion of the projector housing, channel means leading inwardly from said wall portion and adapted to slidably engage said cassette, and at least one angularly extending end-piece located at an extremity of said channel means for determining the maximum inward position of said cassette.

3. A motion-picture projector, as defined in claim 1, wherein said light source and condenser means is in the form of an integral unit including a filament and a spherical reflector providing, in conjunction with said reflective means and said reflective element of the cassette, an elliptical cone of light rays having a focal point adjacent to the entrance pupil of said objective.

4. A motion-picture projector, as defined in claim 3, wherein said objective has a relatively large aperture and wherein said cone of light is adapted to substantially fill the entrance pupil thereof.

5. A motion-picture projector, as defined in claim 4, wherein said light-reflective means thereof is positioned at an angle of approximately 45° to the plane of said film as it is advanced across said gating means, and wherein one end of said light-reflective means terminates at and is adapted to abut an end of said light-reflective element of said cassette when the latter is mounted in the projector, the functional reflective surfaces of said light-reflective means and element then lying in a single plane.

6. Interdependent motion-picture apparatus in part incorporated with a projector and in part with a relatively thin film-cassette carried by the projector to provide a maximum illumination of the film for projection purposes, said apparatus comprising:
   a projector including a housing having a light-emitting aperture formed therein;
   a film-cassette including a relatively thin housing having both light-admitting and light-emitting apertures formed therein at adjacent relatively right-angled wall portions;
   a film-moving mechanism including an intermittent movement mounted within said projector housing;
   gating means, a shutter, and an objective of relatively large aperture mounted adjacent to said projector aperture;
   means providing access to the interior of said projector housing;
   mounting and limit stop means of said projector adjacent to said access means for releasably positioning said film cassette at a correct functional location within said projector housing;
   a light source and condenser means so mounted in said projector housing as to face and direct convergent light rays toward said cassette light-admitting aperture;
   a first light-reflective element mounted at a given angle within a cavity of said cassette which is located directly inwardly of said light-admitting and emitting apertures;
   a second light-reflective element so mounted on said mounting means of the projector at an angle similar to that of said first light-reflective element as to abut an extremity of said first light-reflective element and to provide a functional extension thereof;
   said first and second reflective elements together providing a maximum gathering of light rays from said light source and redirection thereof to said film and thence to said gating means, shutter and objective with a complete coverage by said light rays of the image area of said film and the entrance pupil of said objective.

7. Apparatus facilitating the viewing of motion picture film housed within a cassette when such cassette is mounted in said apparatus, such cassette including a housing having an opening therethrough, a strip of motion picture film, means responsive to externally mounted drive means for progressively advancing such film strip across such opening, a light-reflective element disposed in operative relationship with such opening on the other side of such film strip therefrom, means defining an opening through which rays from an externally mounted light source may be introduced into such cassette and onto such light-reflective element, such light-reflective element being adapted to redirect such light rays outwardly of such cassette through the section of such film strip disposed across such opening and such opening, comprising:
   means for receiving and positioning such cassette within said apparatus;
   means for selectively driving such film strip advancing means of such cassette when such cassette is mounted in said receiving and positioning means;
   a light source positioned with respect to said receiving and positioning means such that only a portion of its light rays will be directed onto such light-reflective element of such cassette when such cassette is mounted in said receiving and positioning means; and
   a light-reflective element disposed in operative relationship to said light source adapted to be positioned in complementary relationship with such light-reflective element of such cassette with at least a major portion thereof exterior of such cassette when such cassette is mounted in said receiving and positioning means so that substantially all of the remaining light rays from said light source are directed thereonto and reflected thereby through such section of such film strip and such opening, thereby effectively illuminating such section of such film strip with the energy emanating from said light source without requiring such cassette to be configured to accommodate a light-reflective element of sufficient size to intercept substantially all of the light source.

8. The apparatus of claim 7 wherein such light-reflective element of such cassette and said light-reflective element of said apparatus comprise substantially flat mirrors.

9. The apparatus of claim 8 wherein such light-reflective element of such cassette and said light-reflective element of said apparatus are positioned at an angle of approximately 45+ to the plane of such section of such film strip when such cassette is mounted in said receiving and positioning means.

10. A motion picture system comprising:
a film handling cassette including:
  a housing having an opening therethrough;
  a strip of motion picture film;
  means responsive to externally mounted drive means for progressively advancing said film strip across said opening;
  a light-reflective element disposed in operable relationship with said opening on the other side of said film strip therefrom; and
  means defining an opening through which light rays from an externally mounted light source may be introduced into said cassette and onto said light-reflective element thereof, said light-reflective element of said cassette being adapted to redirect said light rays outwardly of said cassette through the section of said film strip disposed across said opening and said opening; and
apparatus facilitating the viewing of said film strip when said cassette is mounted therein including:
  means for receiving and positioning said cassette within said apparatus;
  means for selectively driving said film strip advancing means of said cassette when said cassette is mounted in said receiving and positioning means;
  a light source positioned with respect to said receiving and positioning means such that only a portion of its light rays will be directed onto said light-reflective element of said cassette when said cassette is mounted in said receiving and positioning means; and
  a light-reflective element disposed in operative relationship to said light source and adapted to be positioned in complementary relationship to said light-reflective element of said cassette with at least a major portion thereof exterior of said cassette when said cassette is mounted in said receiving and positioning means so that substantially all of the remaining portion of the light rays emanating from said light source are directed thereonto and reflected thereby through said section of said film strip and said opening, thereby effectively illuminating said section of said film strip with the energy emanating from said light source without requiring said cassette to be configured to accommodate a light-reflective element of sufficient size to intercept substantially all of the light rays emanating from said light source.

11. The apparatus of claim 10 wherein said light-reflective element of said cassette and said light-reflective element of said apparatus comprise substantially flat mirrors.

12. The apparatus of claim 11 wherein said light-reflective element of said cassette and said light-reflective element of said apparatus are positioned at an angle of approximately 45° to the plane of said section of said film strip when said cassette is mounted in said receiving and positioning means.

UNITED STATES PATENT OFFICE
CERTIFICATE OF CORRECTION

Patent No. 3,584,941          Dated     June 15, 1971

Inventor(s) Rogers B. Downey

It is certified that error appears in the above-identified patent and that said Letters Patent are hereby corrected as shown below:

In the Specification:

Column 3, line 16, "semienclosing" should be --semi-enclosing--.

Column 3, line 42, "mirrorlike" should be --mirror-like--.

Column 3, line 56, " "super-8" " should be --"Super-8"--.

Column 3, line 68, "is" (second appearance) should be --in--

In the Claims:

Column 5, line 20, "A" should be --a--.

Column 7, line 12, "45+" should be --45°--.

Signed and sealed this 21st day of March 1972.

(SEAL)
Attest:

EDWARD M. FLETCHER, JR.      ROBERT GOTTSCHALK
Attesting Officer            Commissioner of Patents

UNITED STATES PATENT OFFICE
CERTIFICATE OF CORRECTION

Patent No. 3,584,941    Dated June 15, 1971

Inventor(s) Rogers B. Downey

It is certified that error appears in the above-identified patent and that said Letters Patent are hereby corrected as shown below:

IN THE CLAIMS:

Column 8, line 26, "apparatus" should be --system--;

Column 8, line 29, "apparatus" should be --system--.

Signed and sealed this 6th day of June 1972.

(SEAL)
Attest:

EDWARD M. FLETCHER, JR.
Attesting Officer

ROBERT GOTTSCHALK
Commissioner of Patents